J. G. Reiff. Sheet 1. 2 Sheets.

Carriage Spring.

No 3,241. Reissued Dec. 22, 1868.

Witnesses.
A. E. Robitz
13 Mishler

Inventor.
Jacob G. Reiff

J. G. Reiff. Sheet 2. 2 Sheets.

Carriage Spring.

Reissued Dec. 22, 1868.

No. 3241.

Witnesses

H. C. Robertson

B. Mishler

Inventor:

Jacob G. Reiff

United States Patent Office.

JACOB G. REIFF, OF LANCASTER, PENNSYLVANIA.

*Letters Patent No.* 69,588, *dated October* 8, 1867; *reissue No.* 3,241, *dated December* 22, 1868.

IMPROVEMENT IN CARRIAGE-SPRINGS.

The Schedule referred to in these Letters Patent and making part of the same.

*To all whom it may concern:*

Be it known that I, JACOB G. REIFF, of Lancaster, in the county of Lancaster, and State of Pennsylvania, have invented new and useful Improvements in Carriage-Springs; and I do hereby declare that the following is a full and exact description of the same, reference being had to the accompanying drawings, and to the letters of reference marked thereon.

The nature of my invention consists in multiplying or increasing the leaves or plates of the spring from those usually made, and at the same time decreasing their thickness, thereby gaining and maintaining an elasticity not obtained or possessed by any spring now in use, for the purpose specified, the leaves or plates of a spring being multiplied and their thickness diminished by my discovery, in proportion to or according to the height or length of a spring, as also to the weight it may have to bear or carry, and according to the temper of the material.

By my mode of construction, the leaves or plates being of uniform thickness through their lengths, or made gently tapering from the centre, and multiplied to the thickness and resisting-power required, all the parts are acted upon more equally than in springs of the usual construction. Nor can the same elasticity be gained in any other way, in a spring of equal length and bow, though an increased amount of weight be brought to bear upon it.

In order to enable those skilled in the art to make and use my invention, I will proceed to describe its construction and operation.

Figure 4:
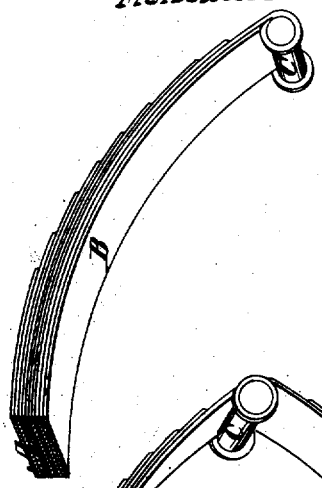
Figure 5:
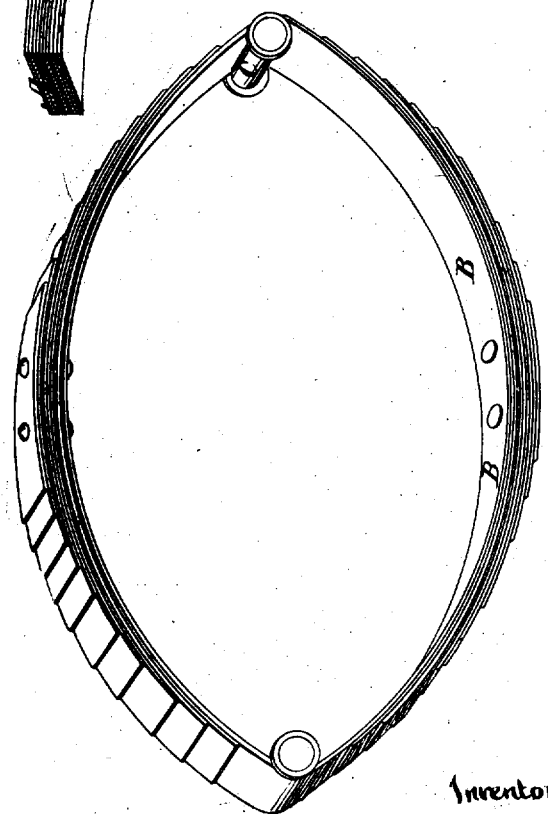
Figure 2:
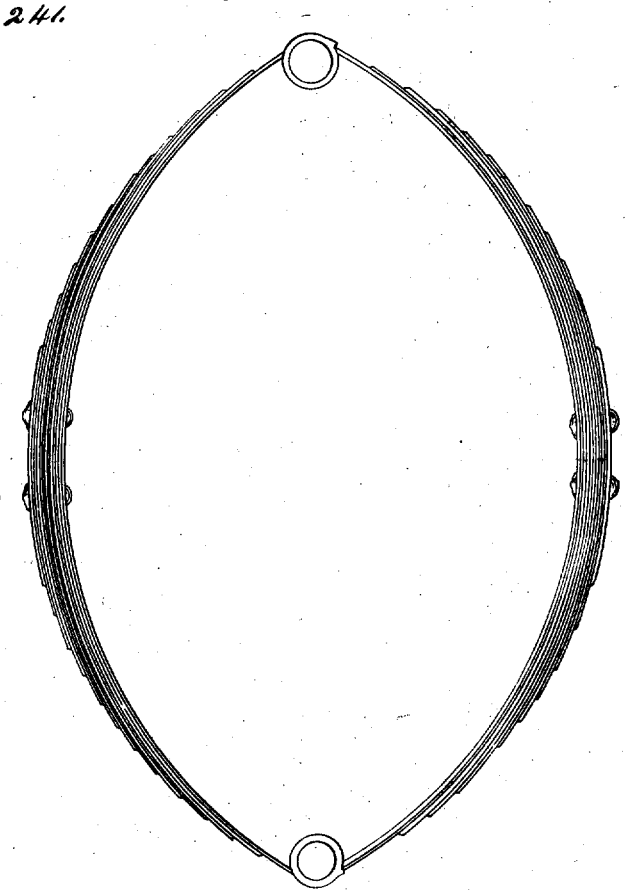
Figure 1:
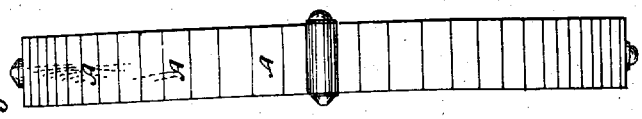

I construct my springs in elliptic or other forms, of steel, or any other suitable material, and graduate the plates, in width, thickness, and number, to suit the length, height, shape, and bow, so to gain the elasticity according to the amount of weight to be carried. I fasten the leaves or plates A, Figure 1, in the same manner as plates or leaves are usually fastened in springs. The main or back plate or leaf B is regulated, as to its individual thickness, by the size and strength required at the ends or joints C, Figure 3, the remaining plates or leaves A, fig. 1, being multiplied or increased in proportion to the thickness of the spring and elasticity required or desired. The leaves being of uniform thickness through their length, or tapering gently or gradually from the centre, the greater the number of leaves that the spring may be composed of, the greater amount of elasticity will be gained.

By means of my discovery, when a spring has no elasticity under a certain weight, I make it elastic under the same weight, by dividing the same thickness of the spring into more plates. I can also make very short and high springs, and can even obtain a circular form, if desired. I can also use much harder and much softer material than is ordinarily used in constructing springs.

Having thus fully described my invention,

What I claim, and desire to secure by Letters Patent, is—

Elliptic and other similar springs, when constructed and arranged as described, for the purpose set forth; that is, when the number of leaves or plates is increased and their thickness diminished, for the purpose of gaining greater elasticity under the same weight, substantially in the manner described for the purpose set forth.

JACOB G. REIFF.

Witnesses:

FREDERIC THOMAS,

C. F. BROWN.